A data processing system and method for regulating a voltage supply to functional circuitry configured to operate from a variable voltage supply, the functional circuitry having at least one error correction circuit configured to detect and repair errors in operation of the functional circuitry. Voltage regulator circuitry provides the voltage supply to the functional circuitry, and modifies the voltage level of the voltage supply based on a feedback control signal. Error rate history circuitry receives error indications from the error correction circuit during operation of the functional circuitry and generates error rate history information therefrom. An adaptive controller then generates the feedback control signal in dependence on the error rate history information such that the adaptive controller adjusts the feedback control signal over time having regard to the error rate history information in order to obtain a predetermined target non-zero error rate within the functional circuitry.

(12) United States Patent
Sandhu et al.

(10) Patent No.: US 8,615,687 B2
(45) Date of Patent: Dec. 24, 2013

(54) DATA PROCESSING SYSTEM AND METHOD FOR REGULATING A VOLTAGE SUPPLY TO FUNCTIONAL CIRCUITRY OF THE DATA PROCESSING SYSTEM

(75) Inventors: Bal S Sandhu, Fremont, CA (US); Sachin Satish Idgunji, San Jose, CA (US); David Walter Flynn, Cambridge (GB)

(73) Assignee: ARM Limited, Cambridge (GB)

( * ) Notice: Subject to any disclaimer, the term of this patent is extended or adjusted under 35 U.S.C. 154(b) by 354 days.

(21) Appl. No.: 12/929,237

(22) Filed: Jan. 10, 2011

(65) Prior Publication Data

US 2012/0023382 A1  Jan. 26, 2012

Related U.S. Application Data

(60) Provisional application No. 61/367,157, filed on Jul. 23, 2010.

(51) Int. Cl.
*G06F 11/00* (2006.01)
*G01R 31/28* (2006.01)

(52) U.S. Cl.
USPC .......................................... 714/708; 714/734

(58) Field of Classification Search
None
See application file for complete search history.

(56) References Cited

U.S. PATENT DOCUMENTS

| | | | | |
|---|---|---|---|---|
| 5,440,520 A | * | 8/1995 | Schutz et al. | 365/226 |
| 5,532,962 A | * | 7/1996 | Auclair et al. | 365/201 |
| 5,712,826 A | * | 1/1998 | Wong et al. | 365/226 |
| 6,115,823 A | * | 9/2000 | Velasco et al. | 713/322 |
| 6,282,661 B1 | * | 8/2001 | Nicol | 713/300 |
| 6,584,571 B1 | * | 6/2003 | Fung | 713/310 |
| 6,901,521 B2 | * | 5/2005 | Chauvel et al. | 713/300 |
| 7,278,080 B2 | | 10/2007 | Flautner et al. | |
| 7,315,796 B2 | | 1/2008 | Flynn | |
| 7,447,919 B2 | * | 11/2008 | Liepe et al. | 713/300 |
| 2002/0116650 A1 | * | 8/2002 | Halepete et al. | 713/300 |
| 2004/0153679 A1 | * | 8/2004 | Fitton et al. | 713/322 |
| 2005/0246613 A1 | | 11/2005 | Blaauw et al. | |
| 2009/0100276 A1 | * | 4/2009 | Rozen et al. | 713/300 |
| 2010/0153680 A1 | * | 6/2010 | Baum et al. | 711/173 |
| 2012/0124421 A1 | * | 5/2012 | Whatmough et al. | 714/26 |

OTHER PUBLICATIONS

Kim et al., "A CMOS Low Power Fully Digital Adaptive Power Delivery System Based on Finite State Machine Control", *Dept. of Electrical Engineering & Computer Engineering*, Northeastern Univ., No Date, 4 pages.

(Continued)

*Primary Examiner* — Daniel McMahon
(74) *Attorney, Agent, or Firm* — Nixon & Vanderhye P.C.

(57) ABSTRACT

28 Claims, 8 Drawing Sheets

(56) References Cited

OTHER PUBLICATIONS

Dhar et al, "Closed-Loop Adaptive Voltage Scaling Controller for Standard-Cell ASICs", *ISLPED* '02, Aug. 2002, pp. 103-107.

Burd et al., "A Dynamic Voltage Scaled Microprocessor System", *IEEE Journal of Solid-State Circuits*, vol. 35, No. 11, Nov. 2000, pp. 1571-1580.

Wei et al., "A Lower Power Switching Power Supply for Self-Clocked Systems", Computer Systems Laboratory, Stanford University, *ISLPED* 1996, No Date, 5 pages.

Das et al., "RazorII: In Situ Error Detection and Correction for PVT and SER Tolerance", *IEEE Journal of Solid-State Circuits*, vol. 44, No. 1, Jan. 2009, pp. 32-48.

* cited by examiner

DATA PROCESSING SYSTEM AND METHOD FOR REGULATING A VOLTAGE SUPPLY TO FUNCTIONAL CIRCUITRY OF THE DATA PROCESSING SYSTEM

This application claims priority to U.S. Provisional Application No. 61/367,157, filed Jul. 23, 2010, the entire contents of which are hereby incorporated by reference.

BACKGROUND OF THE INVENTION

1. Field of the Invention

The present invention relates to a data processing system and method for regulating a voltage supply to functional circuitry of the data processing system.

2. Description of the Prior Art

Within a data processing system, for example an integrated circuit, it is known to employ adaptive power management or dynamic voltage scaling (DVS) techniques in order to reduce the power dissipation within the system. Adaptive power management is becoming ever more important as process geometries decrease. In particular, with leading edge nanometer technology, the individual components are becoming significantly smaller in size, and the decrease in size is giving rise to a significant increase in power consumption due to leakage current (referred to herein as leakage power), leakage current being the current that is drawn by a component when it is in theory turned off. Indeed, in some instances, leakage power is becoming just as high as the dynamic power consumed by the system.

When a data processing system is designed, a nominal operating voltage can be associated with the design. During post-manufacturing tuning, that operating voltage may be modified slightly having regards to variations introduced at the time of manufacture. However, such voltage levels are always by their nature set conservatively, to ensure that the circuit will operate correctly under all expected operating conditions. However, running a system at a voltage higher than necessary has a significant impact on power consumption, and indeed this is becoming more and more of an issue as process geometries decrease for the reasons discussed above.

Adaptive power management techniques aim to reduce the power consumption by allowing system clock frequency and supply voltage to be dynamically adjusted to meet the application throughput requirements. At the system level, adaptive power management requires a voltage/frequency controller that can intelligently vary the speed of operation of the system depending on the application requirements. At the hardware implementation level, a key component is a controller that can automatically generate the minimum voltage required for a desired speed of operation, and allow the voltage to be varied having regard to the operating conditions of the system.

Various types of adaptive power management techniques have been proposed in the prior art. For example, the article "A CMOS Low Power Fully Digital Adaptive Power Delivery System Based on Finite State Machine Control" by Yong-Bin Kim et al, Department of Electrical and Computer Engineering, Northeastern University, Boston, Mass., USA, describes a system that dynamically monitors circuit performance with a slack time detector (a type of canary circuit), and aims to provide a substantially constant minimum-supply voltage for digital processors to properly operate at a given frequency with regard to different process-voltage-temperature (PVT) and load conditions. In particular, the technique adjusts or modulates the duty cycle of a switching regulator using a finite state machine that is fed by a slack time detector to set up the operating point voltage. Global operating voltages are set and the finite state machine then controls the translation of the slack detector output to the duty ratio of a pulse width modulator. The technique described in the article is said to improve yield of logic circuits incorporating the technique, due to the described adaptive voltage scaling technique compensating for variations of intrinsic parameter and operating condition by dynamically adjusting the supply voltage.

The article "Closed-Loop Adaptive Voltage Scaling Controller For Standard-Cell ASICs" by Sandeep Dhar et al, ISLPED '02, Aug. 12-14, 2002, Monterey, Calif., USA, describes a closed-loop controller for adaptive voltage scaling that uses a delay line to achieve a minimum operating frequency, and requires two separate clocks for adjusting the delay line. The approach in particular requires generating a separate sampling clock frequency for the delay line, and needs a charge pump to generate a reference voltage for a voltage regulator. A significant problem with such an approach is that the delay line used in the circuit is symmetrical and does not represent a typical worst case speed path within an integrated circuit.

The article "A Dynamic Voltage Scaled Microprocessor System" by Thomas Burd et al, IEEE Journal of Solid-State Circuits, Volume 35, No. 11, November 2000, Pages 1571 to 1580, describes a microprocessor system in which the supply voltage and clock frequency can be dynamically varied so that the system can deliver high throughput when required whilst significantly extending battery life during low speed periods. The technique described uses a voltage to frequency conversion technique and a ring oscillator to compare the output frequency with a preset value set in a voltage scheduler system control register. However, typically an application program cannot set the clock frequency since it is unaware of other programs running in a multi-tasking system. Hence, the operating system needs to understand the application demands and set a digital value in a control register. The system then uses a voltage regulation loop where the output drives a ring oscillator, and the output clock frequency of the oscillator is converted to a digital value and compared to the value set by the operating system in order to generate a feedback error. This difference in the error adjusts the voltage regulator output until the two frequencies are equalised.

The article "A Low Power Switching Power Supply for Self-Clocked Systems" by Gu-Yeon Wei et al, ISLPED 1996 Monterey, Calif., USA, also describes a dynamic voltage scaling method using a ring oscillator. In particular, the described technique uses a ring oscillator, a DC-DC converter and a PID controller as a method of predicting circuit performance in order to set a minimum regulated voltage on the chip. The ring oscillator output frequency is converted to an equivalent 9-bit binary value by counting the pulses out of the oscillator using a synchronous counter. The binary equivalent of the error between the ring oscillator and a predetermined reference frequency then feeds into the PID control block which drives the DC-DC converter to make the appropriate change to the internal voltage supply.

Whilst the above described techniques all allow savings in power consumption to be achieved, they still inherently have built in safety margins factored into the determination of a minimum operating voltage due to the way in which the provided components, whether they be a slack time detector, a delay line, or ring oscillators, feed into the determination of the operating voltage.

Accordingly, it would be desirable to provide an improved technique for regulating a voltage supply within a data processing system so as to enable further savings in power consumption to be achieved.

SUMMARY OF THE INVENTION

Viewed from a first aspect, the present invention provides a data processing system comprising: functional circuitry configured to operate from a voltage supply whose voltage level is variable, the functional circuitry including at least one error correction circuit configured to detect errors in operation of the functional circuitry and to repair those errors in operation; voltage regulator circuitry configured to provide the voltage supply to the functional circuitry, the voltage regulator circuitry being configured to modify the voltage level of the voltage supply based on a feedback control signal; error rate history circuitry to receive error indications from said at least one error correction circuit during operation of the functional circuitry, and to generate error rate history information; and an adaptive controller configured to generate the feedback control signal in dependence on said error rate history information, such that the adaptive controller adjusts the feedback control signal over time having regard to the error rate history information in order to obtain a predetermined target non-zero error rate within the functional circuitry.

In accordance with the present invention, the functional circuitry whose voltage supply is being varied includes at least one error correction circuit that is able to detect errors in operation of the functional circuitry and repair those errors in operation. Such an error correction circuit can be embodied in a variety of ways, but in one embodiment they take the form of a single event upset (SEU) tolerant flip-flop such as discussed in commonly owned U.S. Pat. No. 7,278,080, the entire contents of which are hereby incorporated by reference, this patent describing a design technique sometimes referred to as "Razor". In accordance with the basic Razor technique, a delay-error tolerant flip-flop is used on critical paths to scale the supply voltage to the point of first failure (PoFF) of a die for a given frequency. Thus, all margins due to global and local PVT variations are eliminated, resulting in significant energy savings. In addition, the supply voltage can be scaled even lower than the first failure point into the subcritical region, deliberately tolerating a targeted error rate, thereby providing additional energy savings. A further paper that describes the Razor technique is "Razor II: In-Situ Error Detection and Correction for PVT and SER Tolerance", IEEE Journal of Solid-State Circuits (JSSC), Volume 44, No. 1, January 2009.

The data processing system of the present invention further includes error rate history circuitry which receives error indications from the at least one error correction circuit during operation of the functional circuitry, and generates error rate history information from those error indications. An adaptive controller then generates a feedback control signal in dependence on the error rate history information, with the feedback control signal being varied over time having regard to the error rate history information. By then feeding this feedback control signal into voltage regulator circuitry, and modifying the voltage level based on the feedback control signal, a minimum voltage can be realised having regard to a desired target non-zero error rate within the functional circuitry. This will typically enable a lower voltage to be set than is possible using the known prior art adaptive power management techniques, thereby providing further power consumption savings.

The manner in which the adaptive controller generates the feedback control signal in dependence on the error rate history information can take a variety of forms. However, in one embodiment, the adaptive controller is configured to apply a feedback control setting algorithm that generates a sequence of said feedback control signals so as to increase the voltage level of the voltage supply by a variable increase amount upon occurrence of an error detected by said at least one error correction circuit and, once said error is no longer detected, to then reduce the voltage level of the voltage supply until a next occurrence of an error detected by said at least one error correction circuit. Further, the feedback control setting algorithm is configured to alter the variable increase amount based on said error rate history information in order to obtain said predetermined target non-zero error rate.

The predetermined target non-zero error rate will typically be a finite but small error rate that will have negligible impact on the performance of the functional circuitry. However, by tolerating some degree of errors, it is possible to seek to reduce the voltage supply to the functional circuitry to an absolute minimum required for correct operation (the error correction circuit(s) enabling correct operation even in the presence of such errors), thus maximising the power consumption savings achievable. By altering the variable increase amount by which the voltage level is increased upon occurrence of an error detected by an error correction circuit, this enables the adaptive controller to influence the error rate observed over time. In particular, if the variable increase amount is made larger, then it will typically be the case that when the voltage level then begins to be reduced, it will take longer until an error is next seen, whereas if the variable increase amount is made smaller, then when the voltage level again begins to be reduced, the next error will be encountered more quickly. Accordingly, by changing the variable increase amount having regard to the error rate history information, the adaptive controller can converge on a sequence of feedback control signals which will cause the predetermined target non-zero error rate to be observed within the functional circuitry.

In one embodiment, the feedback control signal issued by the adaptive controller specifies the variable increase amount as a multiple $M_{up}$ of a minimum adjustment value, the multiple $M_{up}$ being an integer of 1 or more, and the adaptive controller adjusts the value of $M_{up}$ over time having regard to the error rate history information in order to obtain said predetermined target non-zero error rate within the functional circuitry. In a typical embodiment, there will be a predetermined voltage adjustment range over which the voltage regulator circuitry can vary the voltage supply. The minimum adjustment value will then typically be determined by dividing that voltage adjustment range by the number of discrete voltage levels that can be specified by the feedback control signal.

In one embodiment, when reducing the voltage level of the voltage supply, each feedback control signal issued by the adaptive controller causes the voltage regulator circuitry to decrease the voltage level by a specified decrease amount. In one particular embodiment, the feedback control signal issued by the adaptive controller identifies the specified decrease amount as a multiple $M_{down}$ of the minimum adjustment value, the multiple $M_{down}$ being an integer of 1 or more. Hence, as with the variable increase amount, the specified decrease amount is specified in terms of the minimum adjustment value.

In one embodiment, the specified decrease amount may be fixed, by choosing a value $M_{down}$. However, in one embodiment, the specified decrease amount is variable, the adaptive controller being arranged to adjust the value of $M_{down}$ independently of the value of the variable $M_{up}$ used to specify the variable increase amount as a multiple of the minimum adjustment value. In one embodiment, the value of $M_{down}$ will typically be chosen to be less than the value of $M_{up}$ at any particular point in time. Such an approach ensures that when an error is encountered, the voltage can be increased by an amount that is likely to avoid the error reoccurring immediately after it has been corrected, whilst slowly decreasing the voltage in accordance with a smaller $M_{down}$ value ensures that an error is not missed as the voltage is decreased.

As discussed earlier, in one embodiment the voltage regulator circuitry has a predetermined voltage range in which the voltage level of the voltage supply is variable. In one such embodiment, the feedback control signal is an N bit value, enabling up to $2^N$ discrete voltage levels for the voltage supply to be specified, and the voltage regulator circuitry comprises a digital to analogue converter circuit for converting the feedback control signal into an analogue voltage used to generate the modified voltage level of the voltage supply. Hence, by way of example, if the voltage adjustment range is 300 mV, then a 5-bit digital to analog converter (DAC) circuit would provide a minimum adjustment value of 9.3 mV. The DAC resolution may be chosen depending on the desired step size accuracy.

In one embodiment, the adaptive controller has an interface via which an initial value of the feedback control signal is specified, the adaptive controller being configured to select the initial value on occurrence of a predetermined event. The predetermined event can take a variety of forms, for example a reset condition, a change in operating state of the data processing system, etc. The reset condition may for example be a power on reset from an off condition, an exit from a sleep mode of operation, an exit from a retention mode of operation where the retention mode maintains the state of the registers and/or memory, switching into a sleep mode of operation, etc.

The initial value can be set in a variety of ways, and may for example represent a safe voltage value determined after post-manufacturing testing, or a safe value chosen based on a voltage level determined after a canary-based error detection process. In particular, a canary circuit can be used to eliminate a subset of worst-case margins by using a delay-chain which mimics the critical path of the actual design. The propagation delay through this replica path is monitored and the voltage and frequency are scaled until the replica path just about fails to meet timing. The replica path tracks the critical path delay across inter-die process variations and global fluctuations in supply voltage and temperature, thereby eliminating margins due to global PVT variations. However, the replica path does not share the same ambient environment as the critical path because its on-chip location differs. Consequently, margins are added to the replica path in order to budget for delay mismatches due to on-chip variation and local fluctuations in temperature and supply voltage. Margins are also required to address fast changing transient effects such as coupling noise which are difficult to respond to in time with this approach. Furthermore, mismatches in the scaling characteristics of the critical path and its replica require additional safety margins. These margins ensure that the data processing system still operates correctly at the point of failure of the replica path.

Hence, whilst determining the initial value using a canary-based approach will typically enable a lower safe voltage to be set than would be achievable just as a result of post-manufacture testing, it will typically still be a higher voltage than can actually be achieved when using the above described embodiments of the present invention. Nevertheless, such a canary-based voltage value can still provide a good starting point to return to following occurrence of the predetermined event.

In one embodiment, a set of initial values are programmed into the adaptive controller via the interface, each initial value relating to a particular operating state of the data processing system, and the adaptive controller being configured to select one of the initial values dependent on an operating state of the data processing system at the time the predetermined event occurs. Hence, by way of example, different operating states may inherently have different processing loads and different processing speed requirements. Hence, different initial values for the feedback control signal can be set based on those different operating states, such that following the predetermined event the voltage level is set to a predetermined safe voltage level having regard to the expected processing requirements of the data processing system in the particular operating state.

In one embodiment, the data processing system further comprises canary circuitry configured to receive said voltage supply and to operate in parallel with the functional circuitry, the canary circuitry being configured to generate an error ahead of an error occurring in the functional circuitry. In such embodiments, the adaptive controller may be operable in both an in-situ error mode of operation and a canary mode of operation, in the in-situ error mode of operation the adaptive controller being configured to generate the feedback control signal based on the error rate history information generated from the error indications from the at least one error correction circuit, and in the canary mode of operation the adaptive controller being configured to generate the feedback control signal based on error rate history information derived from error indications received from the canary circuit.

Hence, the same adaptive controller can be used in two different modes of operation. In the canary mode of operation, the adaptive controller generates the feedback control signals based on the error indications from the canary circuit, whilst in the in-situ error mode of operation, the adaptive controller generates the feedback control signal based on error indications from the error correction circuit(s) provided within the functional circuitry, indicative of actual errors occurring during operation.

In one embodiment, following an initialisation sequence, the adaptive controller is operated in the canary mode of operation for an initial period of time and is then switched to the in-situ error mode of operation. The initialisation sequence could take a variety of forms, but in one embodiment comprises a power on reset operation. Hence, following a power on reset operation, the adaptive controller can initially operate in the canary mode of operation in order to seek to establish a voltage level for the voltage supply that is close to a minimum achievable having regards to the operating conditions of the data processing system. The adaptive controller can then be switched into the in-situ error mode of operation to fine tune that voltage level with the aim of further reducing it until a predetermined target non-zero error rate is obtained within the functional circuitry.

In one embodiment, in the canary mode of operation the adaptive controller reduces the voltage level of the voltage supply over time until an error is detected in the canary circuitry, and the initial period of time continues until at least one error has been detected in the canary circuitry. In one particular embodiment, the voltage level of the voltage supply is reduced in a sequence of steps until the error is detected, and then the voltage is increased by a determined increase amount following detection of the error, to choose a safe voltage from which to then start the in-situ error mode of operation in which to fine tune the voltage.

As with the in-situ mode of operation, the adaptive controller may vary the feedback control signal so as to specify increase amounts and decrease amounts that are multiples of a minimum adjustment value. The increase amounts and decrease amounts may be set independently for the in-situ mode of operation and the canary mode of operation. In one embodiment, in the canary mode of operation the adaptive controller is configured to generate feedback control signals that cause the voltage regulator to modify the voltage level of the voltage supply in larger increments than when in the in-situ error mode of operation. Hence, the canary mode of operation can be seen to provide a coarse voltage adjustment process, whilst the following in-situ mode of operation then provides a fine voltage adjustment process to fine tune the voltage until the predetermined target non-zero error rate is observed within the functional circuitry.

In one embodiment, the adaptive controller is configured to specify different sizes of increment for an increase in the voltage level and a decrease in the voltage level. In one embodiment, in the in-situ mode of operation, the size of the decreases in the voltage level will typically be smaller than the size of the increases in the voltage level, in order to avoid an error window being missed. However, the same need not apply for the canary mode of operation, and in one embodiment the size of the decreases in the canary mode of operation may be larger than the size of the increases.

In one embodiment, there are other situations where it may be appropriate to enter the canary mode of operation rather than remain in the in-situ mode of operation. For example, in one embodiment, on detection of an operating state where a non-zero rate of error in the functional circuitry cannot be tolerated, the adaptive controller is caused to enter the canary mode of operation. For example, when the data processing system is performing certain critical operations, it may be determined appropriate to run at a voltage level where errors will not be observed by the error correction circuit within the functional circuitry. This can be achieved by arranging the adaptive controller to enter the canary mode of operation, where the feedback control signals are generated having regards to error information obtained from the canary circuitry, as mentioned earlier the canary circuitry generating errors ahead of any errors occurring in the functional circuitry.

The error rate history circuitry can be provided in a number of ways. In one embodiment, the error rate history circuitry is provided within the adaptive controller.

Whilst the error rate history circuitry can take a variety of forms, in one embodiment the error rate history circuitry comprises a digital filter for applying a filtering operation to the error indications received over a period of time in order to generate an average error rate for that period of time. Hence, in such embodiments, the error rate history circuitry can be seen to provide a sliding window through which the error indications are observed, so as to provide an average error rate applicable to that sliding window of time.

In one embodiment, the adaptive controller is configured, on occurrence of at least one predetermined event, to reset the error rate information maintained by the error rate history circuitry. There may be a variety of reasons for resetting the history. For example in one embodiment the at least one predetermined event comprises a change in activity level of the functional circuitry. When the activity level of the functional circuitry changes significantly, it will be appreciated that the preceding error rate history may be of little relevance, and hence it may be appropriate to reset the history upon detection of such a change in activity level.

There are a number of ways in which the change in activity level may be determined. For example, in one embodiment the change in activity level may be signalled by software executing on the functional circuitry. In particular, the software may be aware that it is transitioning from a period of low activity to a period of high activity, or vice versa, and accordingly can signal that fact to the error rate history circuitry to cause the history to be reset.

In another embodiment, the change in activity level may be detected at a hardware level. For example, the data processing system may further comprise prediction circuitry configured to predict a change in activity level of the functional circuitry based on observed changes in load on a voltage line providing the voltage supply to the functional circuitry, and upon said detection to trigger said predetermined event. The prediction circuitry can take a variety of forms, but in one embodiment could take the form of a current surge detector, which on detecting a surge in current predicts an increase in activity for the functional circuitry, and issues a signal to the error rate history circuitry to notify of that change in activity level.

The adaptive controller can take a variety of forms but in one embodiment comprises a state machine, the state machine transitioning between a plurality of states in order to control the setting of the feedback control signal dependent on the error rate history information, and to manage transitions between the canary mode of operation and the in-situ mode of operation.

In one embodiment, the adaptive controller is arranged to receive a ready signal from the voltage regulator circuitry identifying when the voltage level of the voltage supply most recently set by the voltage regulator has reached a steady state. Once the voltage has reached a steady state, then the adaptive controller can determine whether an error is still being observed, and based on that observation determine whether a subsequent adjustment of the voltage level should involve an increase or a decrease of the voltage level.

In one embodiment, the data processing system further comprises clock frequency control circuitry responsive to detection of an error by said at least one error correction circuit to reduce the operating frequency of the functional circuitry from a normal frequency to a recovery frequency to enable said at least one error correction circuit to repair said error. The adaptive controller is arranged on modifying the voltage level to issue a control signal to the clock frequency control circuitry to cause the operating frequency to be returned to the normal frequency. Hence, in such embodiments the adaptive controller is used to tell the clock frequency control circuitry when it is appropriate to return to the normal frequency.

This could be done by the adaptive controller awaiting an indication from the voltage regulator circuitry that the voltage level of the voltage supply most recently set by the voltage regulator has reached a steady state. However, it has been found that further performance improvements can be realised by adopting a multi-bit ready signal, allowing the operating frequency to be returned to the normal frequency somewhat earlier. In particular, in one embodiment, the voltage regulator circuitry transitions the voltage supply from a current voltage level to a new voltage level corresponding to the feedback control signal over a period of time, and the adaptive controller is arranged to receive a multi-bit ready signal from the voltage regulator circuitry identifying progress of the voltage level modification being performed by the voltage regulator circuitry. The adaptive controller is then configured, in response to the multi-bit ready signal indicating that a predetermined amount of progress has occurred, to issue the control signal to the clock frequency control circuitry to cause the operating frequency to be returned to the normal frequency. By such an approach, the adaptive controller may be able to trigger the increase in operating frequency when the multi-bit ready signal indicates that the voltage level modification has almost completed, rather than having to wait until the new voltage level has finally reached a steady state.

In one embodiment, the functional circuitry, voltage regulator circuitry, error rate history circuitry and adaptive controller are provided on an integrated circuit. The technique of such embodiments hence provides an on-chip voltage regulation mechanism allowing the voltage level to be reduced to a level where a predetermined target non-zero error rate within the functional circuitry is observed, thereby significantly reducing the overall power consumption of the integrated circuit.

Viewed from a second aspect, the present invention provides a data processing system comprising: functional circuit means for operating from a voltage supply whose voltage level is variable, the functional circuit means including at least one error correction means for detecting errors in operation of the functional circuit means and for repairing those errors in operation; voltage regulator means for providing the voltage supply to the functional circuit means, the voltage regulator means for modifying the voltage level of the voltage supply based on a feedback control signal; error rate history means for receiving error indications from said at least one error correction means during operation of the functional circuit means, and for generating error rate history information; and adaptive controller means for generating the feedback control signal in dependence on said error rate history information, such that the adaptive controller means adjusts the feedback control signal over time having regard to the error rate history information in order to obtain a predetermined target non-zero error rate within the functional circuit means.

Viewed from a third aspect, the present invention provides a method of regulating a voltage supply to functional circuitry of a data processing system, the functional circuitry including at least one error correction circuit configured to detect errors in operation of the functional circuitry and to repair those errors in operation, the method comprising the steps of: modifying the voltage level of the voltage supply based on a feedback control signal; receiving error indications from said at least one error correction circuit during operation of the functional circuitry, and generating error rate history information; and generating the feedback control signal in dependence on said error rate history information, such that the feedback control signal is adjusted over time having regard to the error rate history information in order to obtain a predetermined target non-zero error rate within the functional circuitry.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
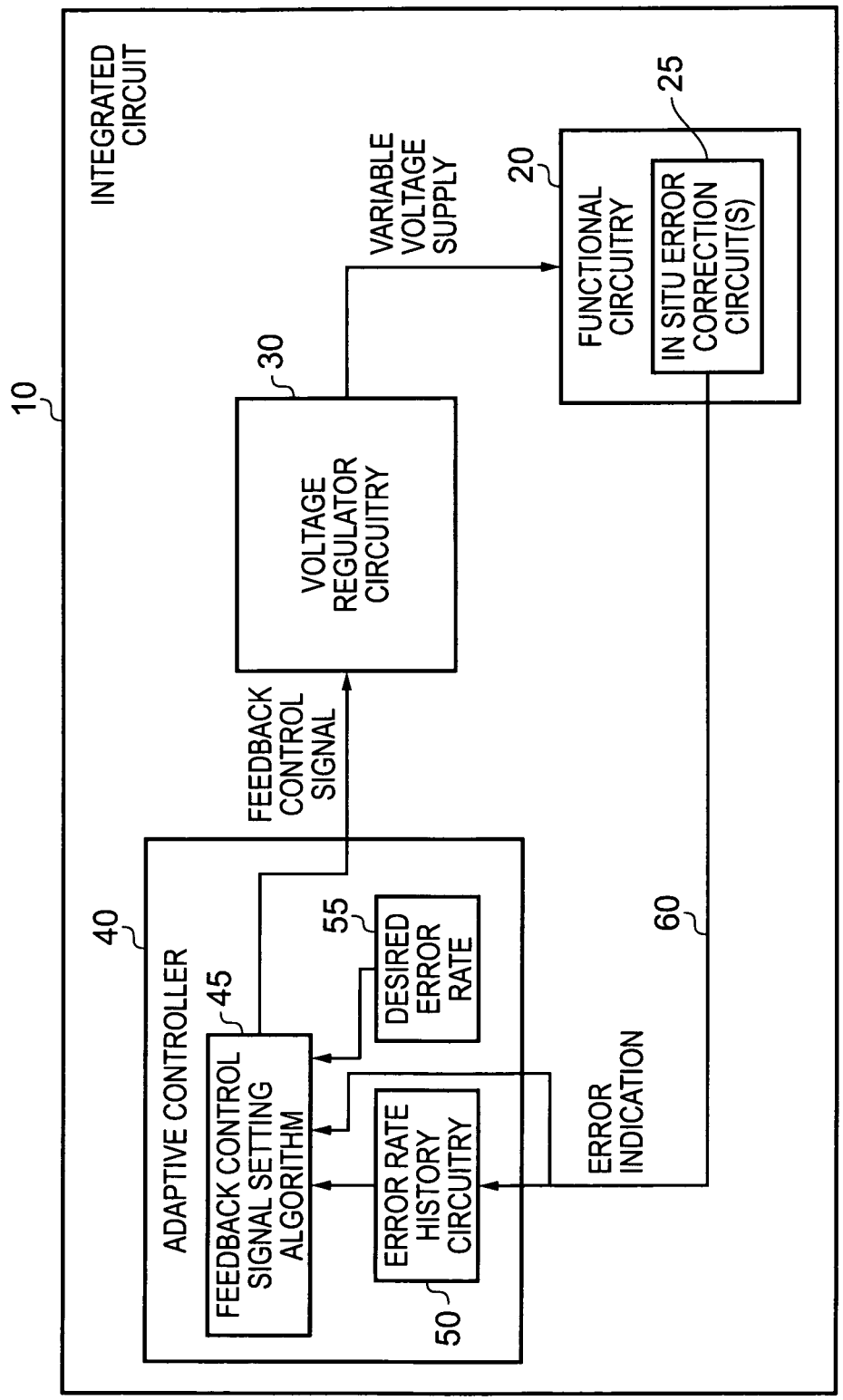
FIG. 1 is a block diagram of a data processing system in accordance with one embodiment.

FIG. 1 is a block diagram of a data processing system in accordance with one embodiment, in this embodiment the data processing system taking the form of integrated circuit 10. Within the integrated circuit 10, functional circuitry 20 is provided for performing the operations required of the integrated circuit. Voltage regulator circuitry 30 is used to provide a variable voltage supply to the functional circuitry 20, with the aim of reducing the voltage level of the voltage supply where possible in order to improve energy consumption of the integrated circuit.

The voltage regulator circuitry 30 is controlled by an adaptive controller 40 which executes a feedback control signal setting algorithm 45 in order to produce a sequence of feedback control signals which are used to control the voltage output by the voltage regulator circuitry 30. One input to the feedback control signal setting algorithm is a desired error rate 55, which is typically set to be a relatively small, but non-zero, error rate defusing the rate of errors within the functional circuitry 20 that the producer of the integrated circuit 10 is happy to tolerate. The fact that errors can be tolerated at all is due to the provision within the functional circuitry 20 of in-situ error correction circuits 25 which are able to detect when a timing error is occurring on a critical path due to the reduction of the voltage supply, and are then able to correct that error, for example by replaying the affected operations.

In one embodiment, such in-situ error correction circuits 25 can be provided by delay-error tolerant flip-flops such as described in the earlier-mentioned commonly owned U.S. Pat. No. 7,278,080, the entire contents of which are hereby incorporated by reference. This patent describes a technique referred to as "Razor". In accordance with the Razor technique, errors are detected in the processing stages by comparison of a non-delayed data value with a delayed data value, these data values being captured at slightly different times. Commonly owned US published patent application no. 2005/0246613, the entire contents of which are hereby incorporated by reference describes a transition detecting flip-flop that can be used to detect timing errors when employing Razor techniques. Timing errors occur in a Razor-like system when propagation delay through combinatorial logic causes the data input to an edge-triggered sequential element, such as a flip-flop, to violate set up requirements. Data may change state in the set up or the hold window causing metastability in the sequential element, or it may transition after the positive edge such that the sequential captures incorrect state data. Razor error detection is provided augmenting each timing critical sequential element with a transition detector. The transition detector flags any transition on the data input of the sequential element in the set up timing window and during the positive phase of the clock.

Accordingly, it will be appreciated that by using Razor circuits within the functional circuitry 20, it is possible to reduce the voltage supply down to a level where certain critical paths start to fail their timing, whilst allowing the functional circuit to recover from such a situation through the error correcting functionality of the Razor circuits. There is clearly a performance impact in recovering from the error, and accordingly it is typically desirable to keep the desired error rate 55 at a relatively low level. However, by maintaining a relatively low but non-zero error rate, it is possible to achieve a reduction in voltage level which enables significant energy savings to be realised.

As shown in FIG. 1, each time the in-situ error correction circuits 25 detect an error, they send an error indication over path 60 to error rate history circuitry 50, which maintains a history of the observed error rate based on the received error indications.

The error rate history circuitry can be arranged in a variety of ways, but in one embodiment comprises a digital filter for applying a filtering operation to the error indications received over a period of time in order to generate an average error rate for that period of time.

The feedback control signal setting algorithm 45 applied by the adaptive controller 40 generates a sequence of feedback control signals so as to increase the voltage level of the voltage supply by a variable increase amount upon occurrence of an error detected by an in-situ error correction circuit 25, the aim being at that point in time to increase the voltage level to a level where the error is no longer detected. Once the error is no longer detected, the feedback control signal setting algorithm then generates feedback control signals that cause the voltage level of the voltage supply to be reduced by specified decrease amounts until such time that an error is again detected, at which point the feedback control signal setting algorithm will again increase the voltage level by a variable increase amount. At least the increase amount is variable, and in one embodiment both the increase amount and the decrease amount is variable. In particular, the feedback control signal setting algorithm 45 has regard to the error rate history provided by the error rate history circuitry 50 and the desired error rate 55 when determining suitable values for the increase amount and the decrease amount, such that over time these variable increase and decrease amounts become set to values which cause the timing between consecutive errors to converge on the desired error rate.

Figure 2:
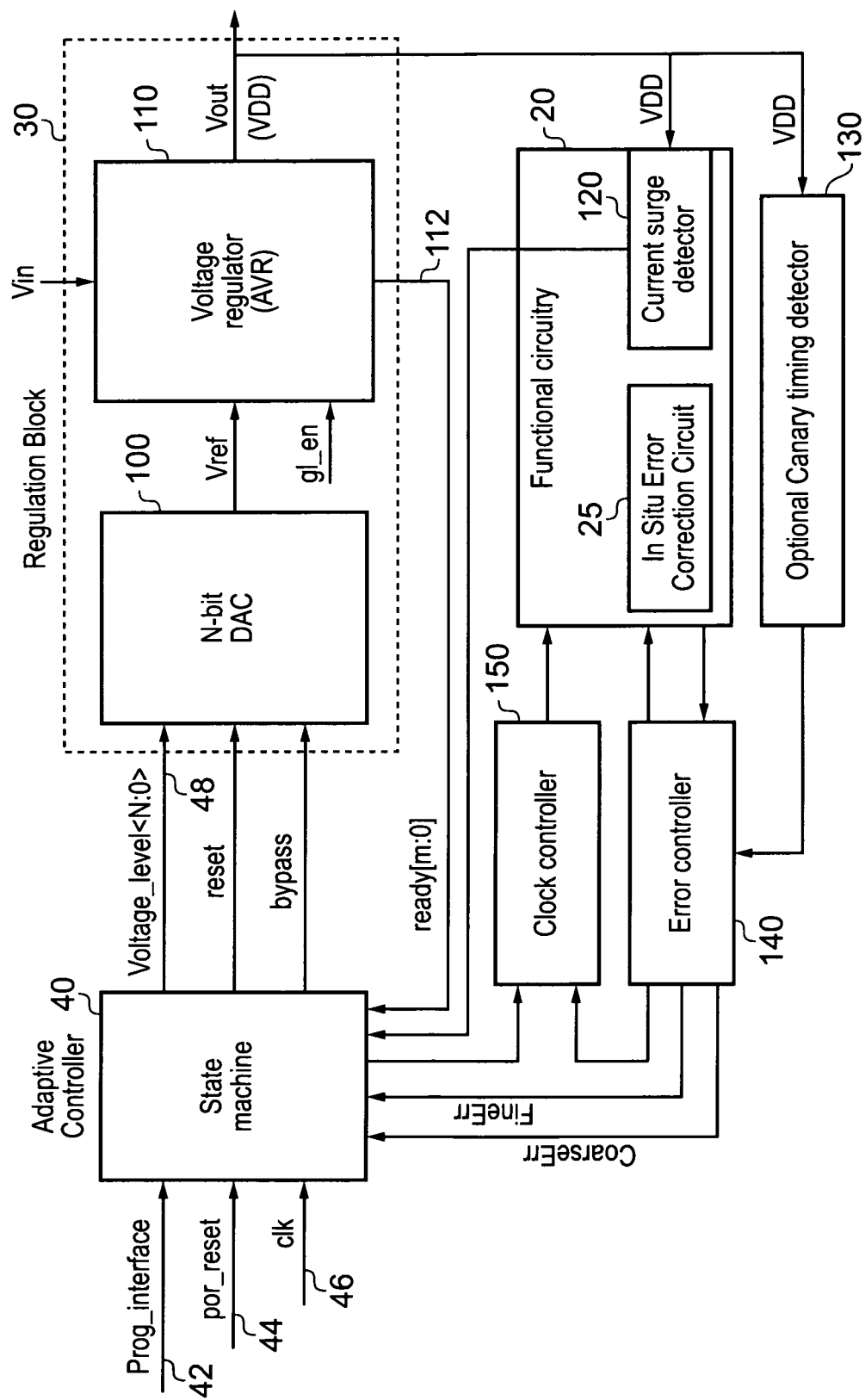
FIG. 2 illustrates in more detail the components provided within a data processing system in accordance with one embodiment.

FIG. 2 is a block diagram illustrating in more detail the components provided within the integrated circuit in accordance with one embodiment. As shown in FIG. 2, the voltage regulator block 30 consists of a voltage regulator 110 that produces an output voltage Vout in dependence on the supplied reference voltage Vref provided by the output of an N-bit digital to analog converter (DAC) 100. The adaptive controller 40 is in the embodiment of FIG. 2 provided by a state machine which serves to implement the feedback control signal setting algorithm 45 of FIG. 1, and whose operation will be discussed in more detail later. The adaptive controller 40 can be reset over path 44, and can be programmed over path 42. The programmable interface 42 may for example be used to program into the state machine one or more safe voltage levels that the system can be initialised to following occurrence of certain reset conditions, changes in operating state, etc.

The adaptive controller 40 is disabled during system power up by a power on reset signal input over path 44. During this time, a reset signal will be issued to the N-bit DAC 100 and the enable signal to the voltage regulator 110 will be disabled, in order to allow the voltage regulator to operate at the nominal voltage operating point without any adaptive features. Following the power on reset sequence, the voltage regulator is then enabled, and the state machine 40 is arranged to issue N-bit voltage level control signals over path 48 to form the earlier-mentioned feedback control signals. Based on each received feedback control signal, the N-bit DAC 100 then creates a corresponding analog voltage Vref that is input to the voltage regulator 110 to control the value of the output voltage Vout.

In one embodiment, prior to using the in-situ error correction circuits 25 to produce error indications to update the error rate history and influence the operation of the state machine 40, a number of preliminary steps are first performed. In particular, following the setting of a nominal voltage supply (for example 1.0V), a coarse adjustment mode may be entered where the voltage is adjusted in relatively coarse increments dependent on error information provided by an optional canary timing detector 130 operating off the same voltage supply as the functional circuitry 20. The canary timing detector 130 is established having regard to critical paths within the functional circuitry 20 and is designed so that it will fail ahead of any actual failure within the functional circuitry 20. There are a number of known designs for such canary timing detectors, as will be well understood by those skilled in the art, and hence its design will not be discussed in any further detail herein.

Accordingly, when in such a coarse adjustment mode (also referred to herein as a canary mode of operation), the state machine will issue a sequence of feedback control signals, each feedback control signal seeking to reduce the previously set output voltage by a predetermined amount. At some point, this will cause an error to be detected within the canary timing detector 130, that error being passed to the error controller 140 which in turn passes that coarse error indication to the state machine 40. At this point, the state machine will respond to the coarse error signal by issuing a revised feedback control signal causing the voltage to be increased by a predetermined increase amount aimed at restoring a voltage which would serve as a safe starting point for a fine adjustment mode of operation where errors generated by the in-situ error correction circuit 25 are used to control the state machine rather than errors from the canary timing detector 130. Hence, it will be appreciated that the increase will be such that some voltage margin is restored relative to the voltage at which the canary timing detector generated an error. This is turn will ensure that there is a safety margin in the voltage supply to the functional circuitry 20, such that when entering the fine tuning mode of operation, there will not at that time be any errors detected by the in-situ error correction circuit 25.

Whilst in one embodiment the coarse voltage decrement amounts and coarse voltage increment amounts applied by the state machine 40 whilst operating in the canary mode of operation may be fixed, in one embodiment they may be adjustable, for example based on a history of coarse errors maintained by the state machine 40.

Following use of the above described canary mode of operation to detect a failure point within the canary timing detector 130, and then to increase the supply voltage level relative to the voltage level used at the time of that canary error, the system then enters a fine tuning mode of operation (also referred to herein as an in-situ error mode of operation). In this mode of operation, the system operates as described earlier with reference to FIG. 1, such that errors detected by the in-situ error correction circuitry 25 are propagated on via the error controller 140 to the state machine 40 to update the error rate history and to trigger periodic increases in the voltage as such errors are detected. Hence, during the in-situ error mode of operation, the state machine will issue a sequence of feedback control signals that serve to decrease the supply voltage Vdd by variable decrease amounts, and on detection of each error by the in-situ error correction circuit 25 then serve to increase the supply voltage by a variable increase amount. Over time, the state machine serves to choose a value of variable increase amount and a value of variable decrease amount such that the timing between each error detected by the in-situ error correction circuit 25 converges on the desired error rate 55.

Each time an error detected by the in-situ error correction circuit 25 is notified to the error controller 140, then in addition to passing that error indication on to the state machine 40, the error controller 140 also notifies the clock controller 150 used to control the frequency of the clock provided to the functional circuitry 20. To assist the in-situ error correction circuit 25 in correcting the error, for example by replaying the affected operations, the clock controller 150 serves to decrease the clock frequency during that recovery period so as to ensure that the relevant timing paths no longer fail and that the error is corrected. Also during this time, the state machine 40 in combination with the voltage regulation block 30 will be seeking to increase the supply voltage, and the state machine 40 in one embodiment receives a ready signal over path 112 from the voltage regulator 110 providing feedback on the voltage adjustment process. In one embodiment, this could merely be a one bit signal that is issued by the voltage regulator 110 to notify the state machine 40 when the most recent adjustment to the supply voltage requested by the state machine via its feedback control signal has reached a steady state. At that point, the state machine 40 can then notify the clock controller 150 that it is safe to increase the clock frequency back to the normal frequency.

However, it will take a finite amount of time for the adjustment requested by the state machine 40 to actually be reflected in the output voltage from the voltage regulator 110, and the disadvantage of a single bit ready signal is that useful forward progress processing may be inhibited since the single bit ready signal masks what actual voltage level is currently valid. Techniques such as adding an on-chip analog-to-digital converter to monitor the voltage indirectly are not ideal as these cost more real estate and have an inherent latency. Instead, in one embodiment, an enhanced mode of signalling is provided whereby the ready signal from the voltage regulator 110 is a multi-bit ready signal providing an indication to the state machine 40 of the progress of the voltage adjustment process that it has requested. Based on this information, the state machine can be set so that it is arranged to notify the clock controller 150 that it is safe to increase the clock frequency again at some point prior to the voltage level stabilising at the new voltage level requested by the state machine 40. In effect this enables the state machine to trigger the increase in the clock frequency at a point when the voltage level has been increased to near the requested level, thereby providing a performance improvement.

In addition to being able to reset the N-bit DAC 100 (such as during a power on reset or during any other soft reset event that requires the circuitry to restart at the nominal voltage, for example in order to bring the system rapidly to a safe operating point), the state machine 40 is also in one embodiment able to issue a bypass signal to the N-bit DAC 100. When the bypass signal is set, fine tuning operation is bypassed, and accordingly whilst the bypass signal is set the N-bit DAC is not responsive to changes in the feedback control signal over path 48. Instead, the current output voltage is maintained. This can be useful in a variety of situations, for example during a soft reset operation.

It will be understood by those skilled in the art that the voltage regulator 110 can be operated in either a linear or a switch mode of operation. If the load to be driven by the output voltage is relatively low (for example 50 mA or less), then the linear mode of operation will typically be more appropriate, whilst if the load is relatively high (greater than 50 mA) then the switching mode of operation may be more appropriate.

Whilst in the above discussion, the error controller 140 notifies the clock controller 150 upon detection of errors by the in-situ error correction circuit 25, in an alternative embodiment the in-situ error correction circuit 25 may itself cause the clock frequency to be lowered independent of the error controller 140.

The functional circuit 20 may include hardware prediction circuit to predict a change in activity level of the functional circuitry 20. In one embodiment, this takes the form of the current surge detector 120. The current surge detector 120 is responsive to detection of a surge in current to issue a signal to the state machine 40 indicating that the functional circuitry is expected to move to a period of increased activity. Such an increase in activity is likely to trigger an error being detected by the in-situ error correction circuit 25 if the voltage is maintained at its current low level, and accordingly the signal from the current surge detector 120 can be used to cause the state machine 40 to exit the fine tuning mode of operation and instead select a safe operating voltage (as for example may be set via the programming interface 42). Such a signal from the current surge detector may also be used to reset the history maintained by the error rate history circuitry.

As an alternative to such prediction hardware, software executing on the functional circuitry may itself detect changes in activity level of the functional circuitry and notify the state machine accordingly.

Figure 3:
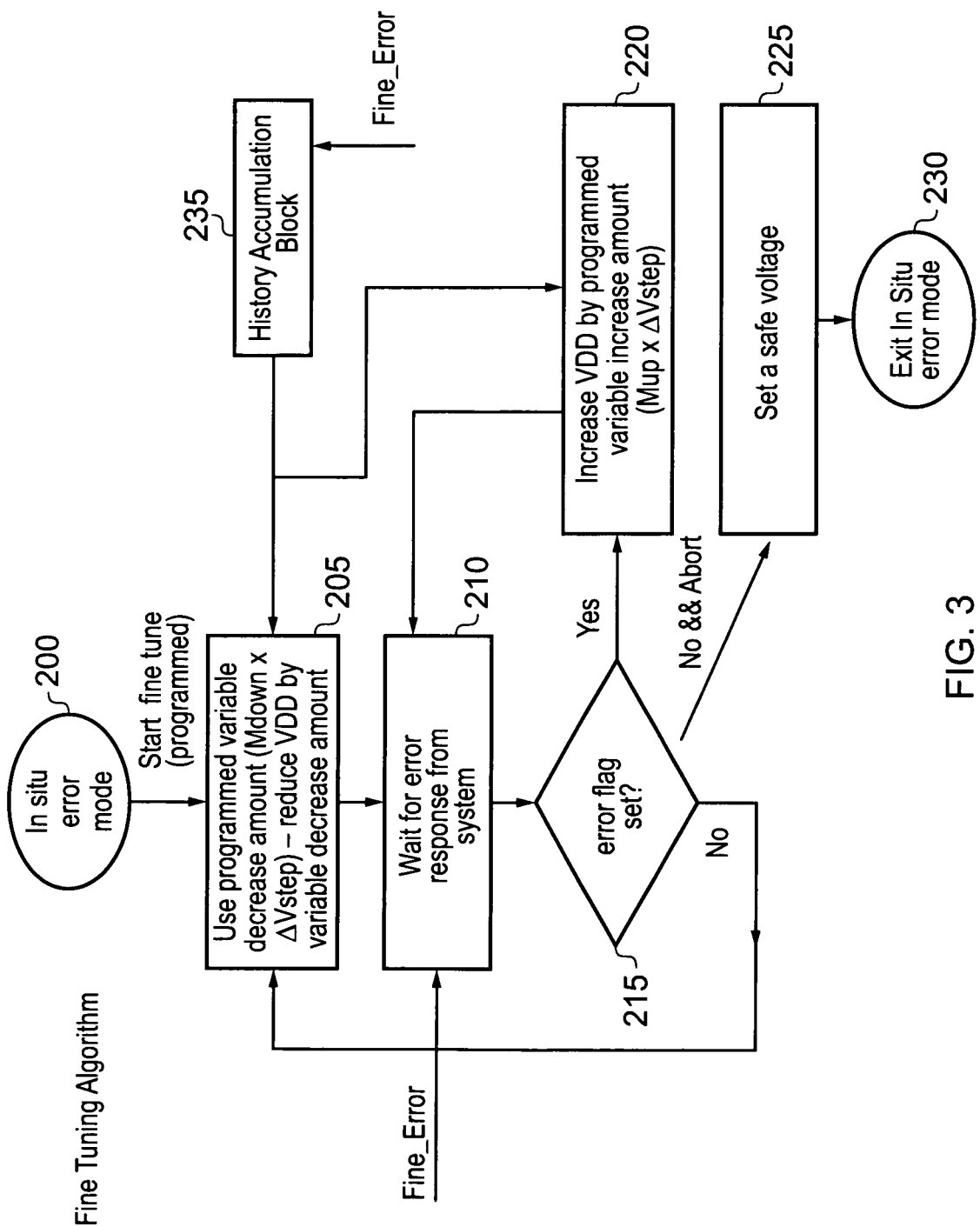
FIG. 3 is a flow diagram illustrating a fine tuning algorithm used in accordance with one embodiment.

FIG. 3 is a flow diagram illustrating in more detail the fine tuning algorithm employed when the adaptive controller is operating in the in-situ error mode of operation. At step 200, the in-situ error mode is entered, where the fine tuning process is then started. At step 205 the current variable decrease amount programmed into the state machine is used to reduce the current supply voltage by that variable decrease amount. In one embodiment, the variable decrease amount is a multiple $M_{down}$ of a minimum step size $\Delta V Step$. The minimum step size $\Delta V Step$ is defined by the resolution of the DAC 100. In particular, the voltage regulator 110 will have an overall adjustment range Vadj over which it can adjust the voltage. Assuming the DAC 100 has a resolution of N bits, then the minimum step size $\Delta V Step$ is given by the following equation:

$$\Delta Vstep = \frac{Vadj}{2^N}$$

Accordingly, by way of example, if the range of voltages for the supply voltage is between 1.0V and 0.7V, then the voltage adjustment range Vadj is 300 mV. Assuming the DAC 100 is a five bit DAC, then the minimum step size $\Delta V Step$ is 9.3 mV (i.e. 300/32). The value of $M_{down}$ can be set to an integer of one or more so as to specify one or more multiples of the minimum adjustment size by which the voltage should be reduced at step 205.

The process then proceeds to step 210, where the state machine waits for an error response from the system based on the fine error signal output from the error controller 140. This wait period is determined having regard to the amount of time it takes for the voltage regulator circuitry to produce a stable output voltage at the new reduced voltage level, whereafter it can be assessed whether the new stable voltage level is giving rise to any errors in the in-situ error correction circuit 25.

Following the wait period 210, it is determined at step 215 whether the error flag has been set, i.e. whether the error controller 140 has asserted a fine error signal to the state machine 40. If not, the process returns to step 205, where the voltage is again reduced by the variable decrease amount.

However, if at step 215, it is determined that the error flag is set, then the process proceeds to step 220, where the state machine 40 seeks to increase the supply voltage by a programmed variable increase amount, this being specified by a multiple $M_{up}$ of the step size $\Delta V Step$. Like $M_{down}$, the variable $M_{up}$ can be set to an integer of one or more, and in one embodiment the values of $M_{down}$ and $M_{up}$ are set independently, and may typically have different values. In particular, the value of $M_{up}$ will generally be larger than the value of $M_{down}$ whilst in the fine tuning mode of operation, as this ensures that once an error has been detected, the voltage is increased by an amount that is likely to avoid the error immediately reoccurring. Further, small decrease amounts ensure that an error occurring within the error timing window of the in-situ error correction circuit 25 is not overlooked.

As illustrated in FIG. 3, if at the time the error flag is evaluated at step 215, it is determined that there is no error and an abort signal has been set, then the process proceeds to step 225, where a safe voltage is set, for example based on a value programmed into the state machine via the program interface 42, and thereafter the in-situ error mode is exited at step 230. The safe voltage used at step 225 can be determined in a variety of ways. For example, it may be a standard operating voltage such as 1.0V, or can be some voltage determined specifically for the system in question during some post-manufacturing tests. Alternatively, it can indeed be a voltage that has been determined as a result of a previous coarse tuning algorithm applied by the state machine prior to entering the fine tuning mode of operation.

As illustrated schematically in FIG. 3, the fine errors received over time are passed to a history accumulation block 235 such as embodied by the error rate history circuitry 50 shown in FIG. 1. The values of $M_{down}$ and $M_{up}$ are set having regard to the error rate history maintained by the history accumulation block 235 with the aim over time of causing the observed error rate to converge towards a desired error rate for the system. For example, if the error rate history maintained by the history accumulation block indicates that the actual error rate is lower than the desired error rate, then at least the variable increase amount $M_{up}$ may be reduced, so that following application of a variable increase amount at step 220, and then beginning to reduce the voltage through one or more sequences of the step 205, it is more likely that an error will be observed more quickly. In one embodiment, the variable decrease amount is also adjusted as the variable increase amount is adjusted, and typically is adjusted in the same direction as the variable increase amount, such that for example if the variable increase amount is decreased, the variable decrease amount is also decreased. This is due to the fact that the likelihood of an error increases as the voltage reduces. Indeed, even between two consecutive occurrences of an error being detected, on each iteration through the loop provided by steps 205, 210, 215, the value of $M_{down}$ may be decreased, so as to use smaller decrease amounts as the voltage reduces towards the point where an error is likely to be detected.

As discussed earlier, a number of initial steps may be performed prior to entering the in-situ error mode at step 200. In particular, the steps that may be performed in one embodiment are set out in FIGS. 4A and 4B. As shown in FIG. 4A, as part of an initialisation sequence, for example a power on reset, the process starts at step 250. A power on reset is not the only example of an initialisation sequence which may cause step 250 to be performed. For example, when the system exits a sleep mode or a retention mode, the process of FIG. 4A may also be invoked.

Following step 250, the process proceeds to step 255 where a nominal supply voltage (for example 1.0V) is set and the chip is powered up at step 260. At step 265, a check is performed to determine whether the voltage supply is stable. Until the voltage is stable, the system remains in the power up state 260, but as soon as the voltage is determined to be stable, the process proceeds to step 270, where a coarse adjustment mode of operation is entered.

Figure 4B:
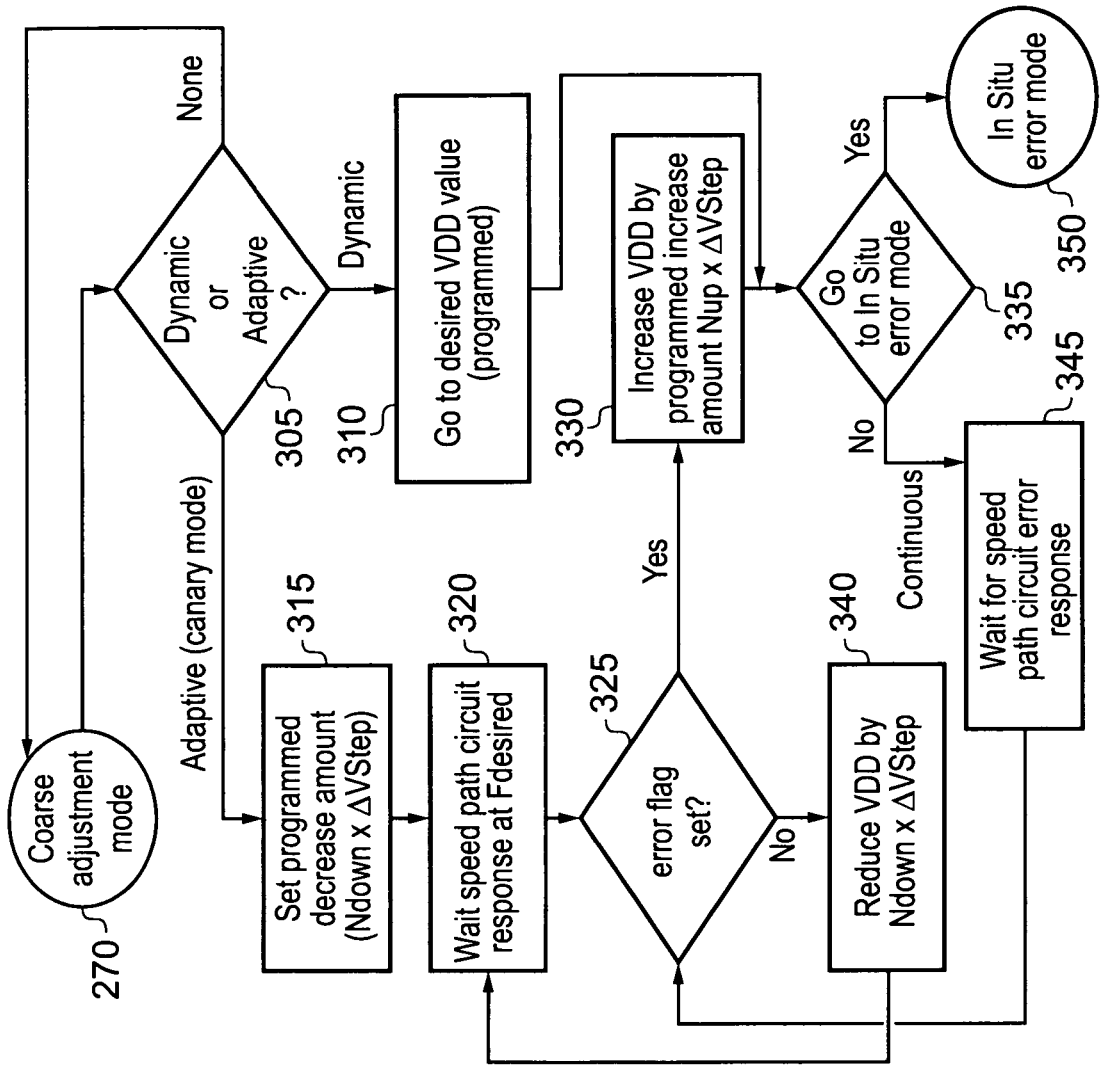
FIGS. 4A and 4B are flow diagrams illustrating a sequence of steps that may be performed prior to performing the fine tuning algorithm of FIG. 3 in accordance with one embodiment.
Figure 4A:
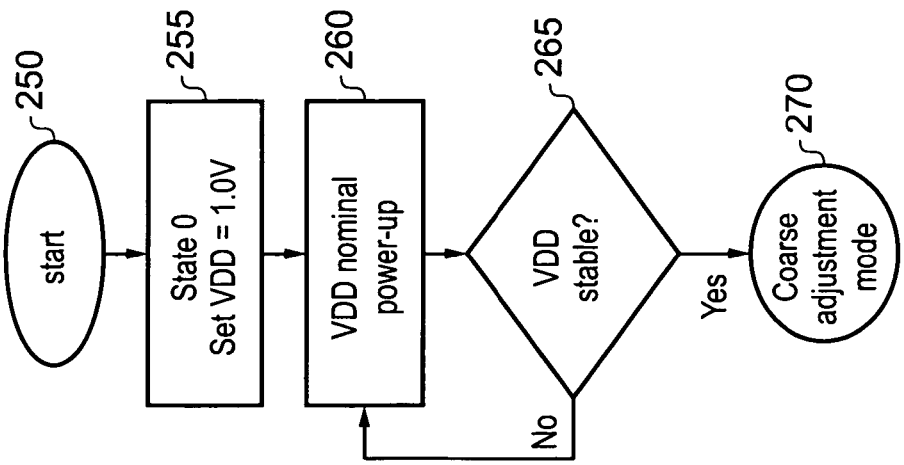

FIG. 4B illustrates the coarse adjustment mode of operation. Two types of coarse adjustment are supported in one embodiment, namely a dynamic mode and an adaptive mode, the adaptive mode corresponding to the earlier described canary mode of operation. Accordingly, at step 305, it is determined whether a dynamic mode or an adaptive mode is to be used. If it is determined that the dynamic mode is to be used, then the process proceeds to step 310, where the state machine issues a control signal to the DAC 100 to cause the voltage regulator to adjust the nominal voltage to some desired pre-programmed value, such as may have been programmed in via the program interface 42 of FIG. 2. Accordingly, in the dynamic mode of operation, the adjustment is not based on any form of tuning process, but instead the system decides a predefined operating point based on, for example, knowledge of frequency, voltage (safe) operating points (typically margin based), etc.

Following step 310, the process then proceeds to step 335, where the process may then go into the in-situ error mode of operation, following the yes branch of step 335 to step 350.

However, in an alternative embodiment, it could be decided following the dynamic coarse adjustment to then enter the adaptive coarse adjustment of the canary mode of operation, in which case the no path from step 335 is followed, where at step 345 the process awaits a speed path circuit error response. In particular, with reference to the embodiment of FIG. 2, once the programmed value of voltage at step 310 has reached a stable state, the state machine 40 will await a coarse error signal from the error controller 140 based on the operation of the canary timing detector 130. The process then proceeds to step 325 where the value of the coarse error signal output by the error controller 140 is evaluated.

This then enables the process to enter the adaptive canary mode, which can also alternatively be entered directly at step 305. If entered at step 305, then at step 315 a programmed decrease amount is set to be used in the canary mode of operation, this decrease amount being a multiple $N_{down}$ of the minimum step size $\Delta V Step$.

Following step 315, a response from the speed path circuit at the desired operating frequency is awaited at step 320. Step 320 is hence analogous to the earlier described step 345.

Thereafter, at step 325, it is determined whether the error flag has been set by the error controller 140 based on the output from the canary timing detector 130. If not, the voltage is reduced at step 340 by the programmed decrease amount set at step 315, whereafter the process returns to step 320. However, if an error flag has been set, then the process branches to step 330 where the supply voltage is increased by a programmed increase amount set equal to a multiple $N_{up}$ of the minimum step size $\Delta V Step$.

As with the values $M_{up}$ and $M_{down}$ used in the fine tuning mode of operation, the values of $N_{up}$ and $N_{down}$ can be varied if desired. In one embodiment of the coarse adjustment using the canary mode of operation, the downward adjustments may be chosen to be larger than the upward adjustment such that the process relatively quickly reduces the voltage to achieve the optimum point of operation (based on failure of the canary timing detector 130), and then moves up gradually to the point where the failure of the canary detector is not seen, thereby determining the operating point at which it would be appropriate to enter the in-situ error mode of operation.

As shown in FIG. 4B, the system can in one embodiment immediately enter the in-situ error mode of operation as soon as a single error has been detected in the canary timing detector 130 and a suitable increase of the supply voltage applied at step 330 (by then following the yes path from decision step 335 following the increase at step 330). Alternatively, the system may be placed in a perpetual or continuous mode where it stays in the adaptive coarse adjustment mode of operation for a prolonged period of time, in order to provide error feedback to the adaptive controller 40 at discrete but continued intervals to allow the voltage to be adjusted over time.

However, in one embodiment, the in-situ error mode of operation 350 is entered as soon as a single error has been detected by the canary timing detector 130 and a suitable increase to the voltage has been applied at step 330, with the in-situ error mode then being maintained whilst the functional circuitry is in a particular operating state, for example an operating state associated with a high workload level, an operating state associated with a low workload level, etc. When the functional circuitry then changes operating state, and particularly where that change in operating state involves a change in activity level of the functional circuitry, then in one embodiment the in-situ error mode may be exited, and the coarse adjustment mode used in order to set up a suitable starting point for the voltage level to be used in the new operating state of the functional circuitry. Following that process, the fine adjustment mode may again be entered to finely tune the voltage used whilst in that new operating state.

Figure 5:
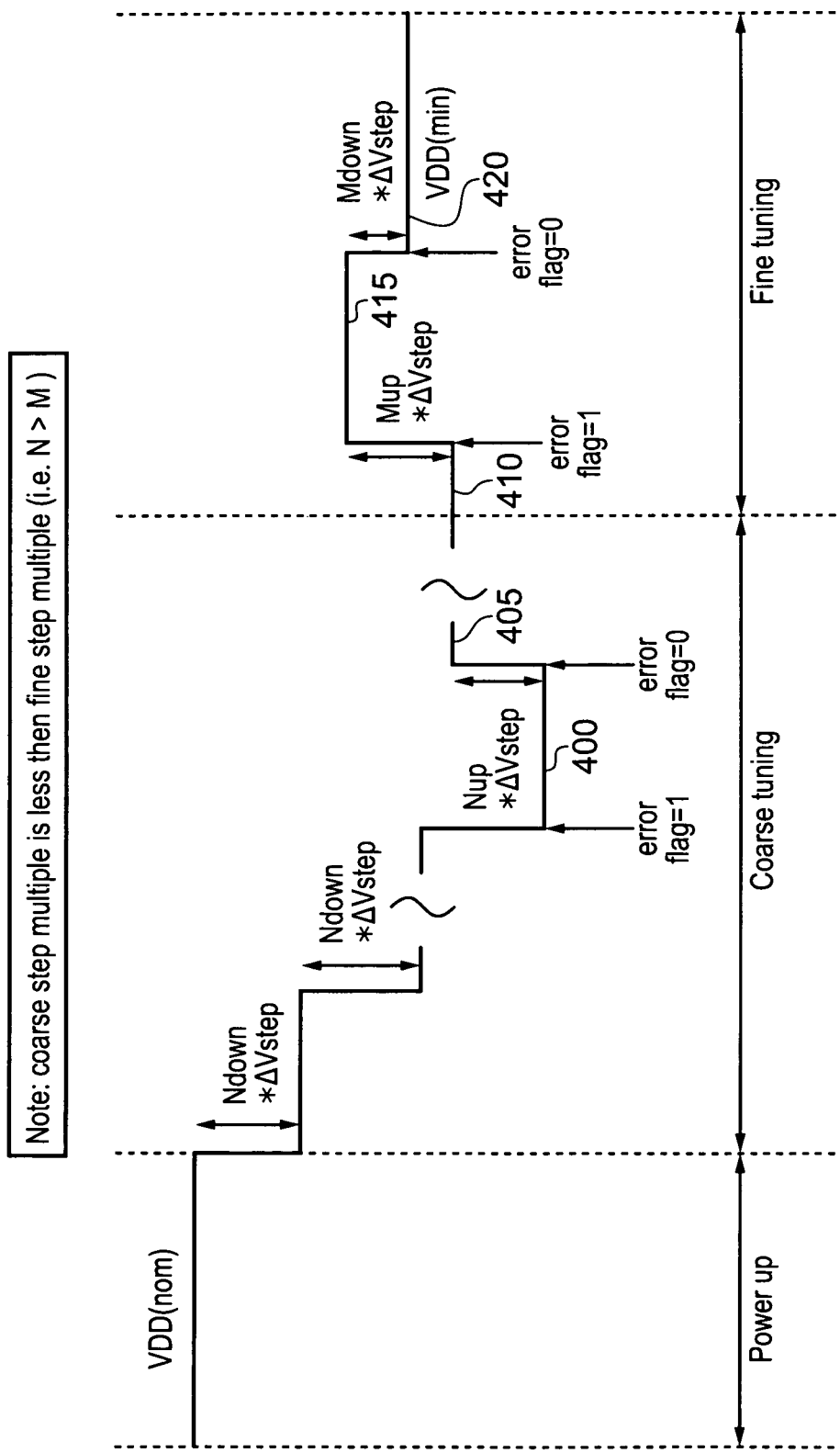
FIG. 5 schematically illustrates how the voltage level of the voltage supply may be varied following power up of the data processing system in accordance with one embodiment.

FIG. 5 is a graph schematically illustrating how the voltage level may be decreased and increased during the earlier described coarse tuning and fine tuning modes of operation. In particular, following the power up process where a nominal voltage is established using the process of FIG. 4A, a coarse tuning mode of operation is entered such as described earlier with reference to FIG. 4B. In the embodiment illustrated in FIG. 5, it is assumed that the canary mode of operation is used as the coarse adjustment mode, and accordingly the voltage level is decreased in steps of the programmed decrease amount until a voltage level 400, at which point the error flag is set by the error controller 140 indicating the presence of an error detected by the canary timing detector 130. Accordingly, this causes the process of FIG. 4B to branch from step 325 to step 330, where the voltage level is then increased to the level 405. In the example of FIG. 5, once the voltage level has been increased to the level 405, the error flag is then cleared, indicating that this has been sufficient to avoid the error again being detected by the canary timing detector 130.

In one embodiment, following this coarse tuning process, the process then proceeds to the fine tuning process discussed earlier with reference to FIG. 3. In the example of FIG. 5, it is assumed that an error flag is set in the fine tuning mode of operation whilst the voltage is at the level 410, causing the process of FIG. 3 to branch from steps 215 to step 220, and thereby increase the voltage level by the programmed increase amount in order to raise the voltage level to step 415. It is then assumed in the example of FIG. 5 that this is sufficient to clear the error, and accordingly when the error flag is next evaluated, it is determined that no error is present. The process hence branches from step 215 to step 205, and begins to reduce the voltage by the variable decrease amount, thereby reducing the voltage to the level 420. The voltage will continue to be decreased by the variable decrease amount until an error is next detected, at which time an increase will be applied. The aim is to converge to a minimum voltage level which causes the functional circuitry to observe errors at the desired error rate. For simplicity, the detail of this is not shown in FIG. 5, but FIG. 6 schematically illustrates the fine tuning adjustment process that takes place.

Figure 6:
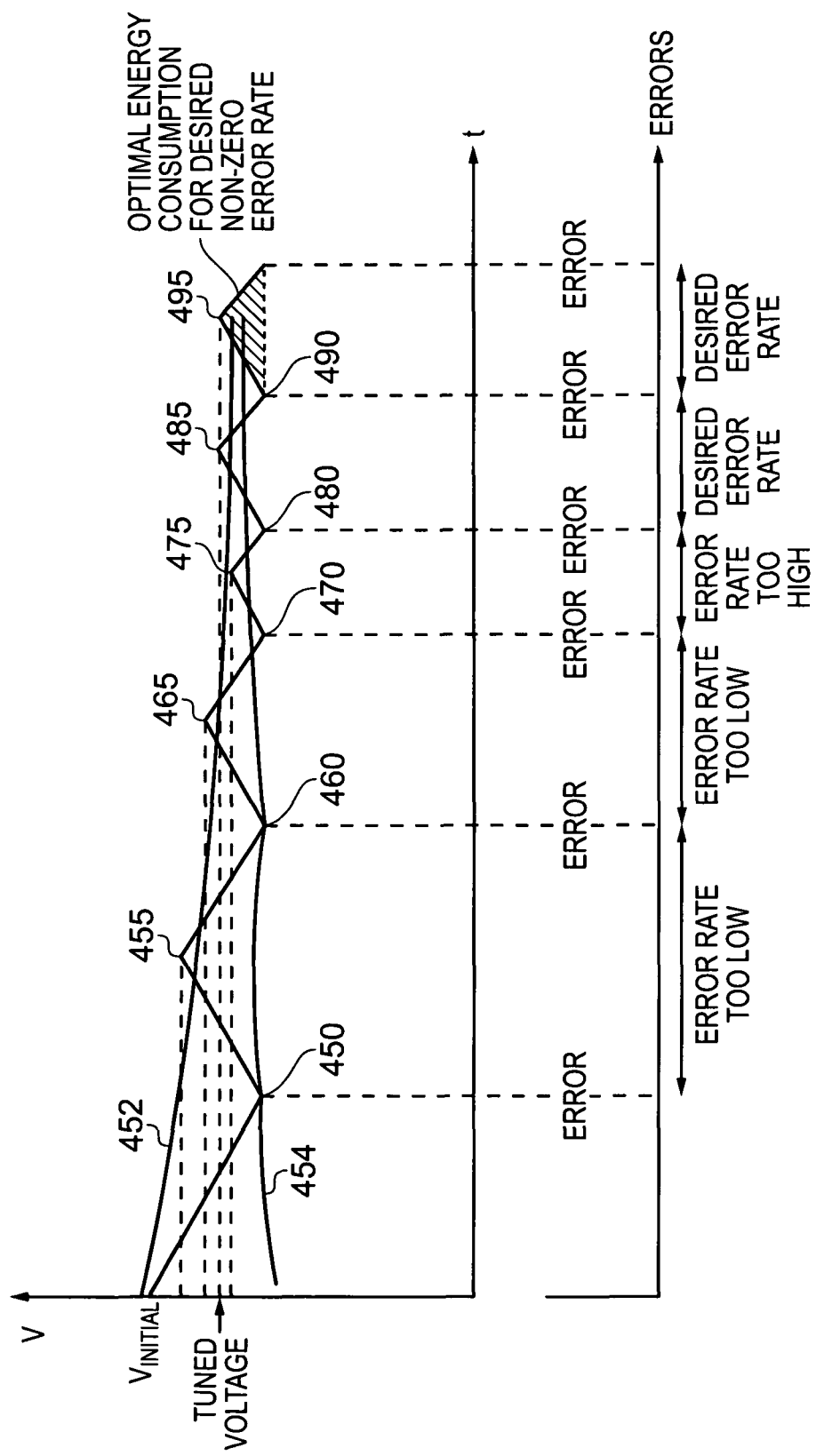
FIG. 6 illustrates how adjustments to the voltage level of the voltage supply during the fine tuning mode of operation of one embodiment lead to convergence on an optimal energy consumption for a desired non-zero error rate.

As illustrated in FIG. 6, following the establishment of an initial supply voltage at the time of entry into the in-situ error mode, the state machine 40 loops through steps 205, 210, 215 of FIG. 3, reducing the supply voltage in steps of the variable decrease amount until an error is detected at point 450. At this point, the process branches to step 220 where the voltage is increased to a voltage level 455 by application of the current variable increase amount. Assuming this is sufficient to remove the error, the process then again loops through steps 205, 210, 215 in order to slowly reduce the voltage level until an error is again detected at point 460. Assuming that the time between the error points 450 and 460 in combination with the other error rate history available to the history accumulation block indicates that the current error rate is too low, then the variable increase amount will have been reduced. Accordingly, when the variable increase amount is applied following the error being detected at step 460, this results in the voltage level being increased to the level 465 which is somewhat less than the level 455.

The voltage level is then again decreased until another error is detected at point 470. Assuming at this time, the accumulated error history still indicates that the error rate is too low, then the variable increase amount will again be decreased, and accordingly when the voltage is increased following the error at step 470, it is increased to a reduced level 475, and thereafter the voltage is again reduced until an error is detected at step 480. If at this point it is now determined that the error rate is too high, it will be determined that the reduction in the variable increase amount previously made was too large, and accordingly the variable increase amount will be increased. As a result, following the error at point 480, the voltage is increased to the level 485.

The voltage level is then again reduced until the error is detected at step 490. It is assumed for the purposes of the illustration of FIG. 6 that at this point the cumulative error rate is now running at the desired error rate, and accordingly no change to the programmed variable increase amount is needed. Accordingly, the voltage is increased to the voltage level 495, which corresponds with the voltage level 485, and then the voltage is reduced again.

Since the larger the change in voltage made, the greater the power consumed, it will be understood that the area under each of the triangles in FIG. 6 gives a measure of the power consumed. The shaded area show in FIG. 6 is representative of the optimal energy consumption for the desired non-zero error rate. In addition, the lines 452, 454 in FIG. 6 schematically illustrate the convergence that occurs during the fine tuning mode of operation.

Whilst the above discussion of FIG. 6 has concentrated on the changes made to the variable increase amount, it will also be understood that in one embodiment the variable decrease amount is also adjusted. In one embodiment, the variable decrease amount is adjusted having regard to the adjustments made to the variable increase amount. Further, in one embodiment, the variable decrease amount may actually change even between occurrence of sequential errors so as to reduce the variable decrease amount as the expected point of failure is approached. Accordingly, whilst in FIG. 6 the paths between points 455 and 460, points 465 and 470, points 475 and 480 and points 485 and 490 are shown as following a linear line, they may alternatively follow the form of an exponential decay so that as the point of failures 460, 470, 480, 490 are approached, the variable decrease amount is reduced.

Another factor that is taken into account when managing the values of $M_{up}$ and $M_{down}$ is to ensure that the rate of change is controlled so as not to induce too much noise.

Figure 7:
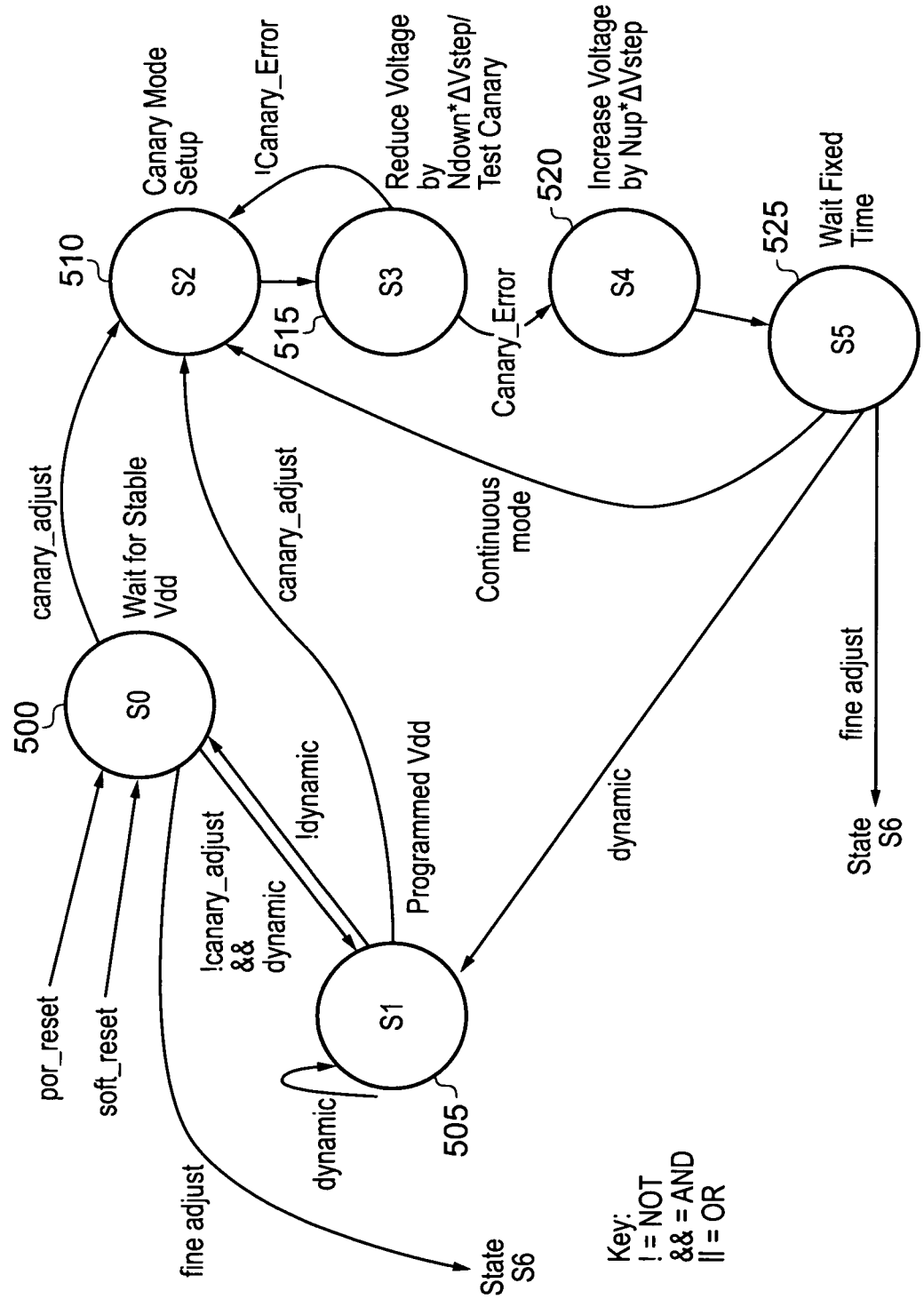
FIGS. 7 and 8 are state diagrams illustrating the operation of the state machine of FIG. 2 in accordance with one embodiment.
Figure 8:
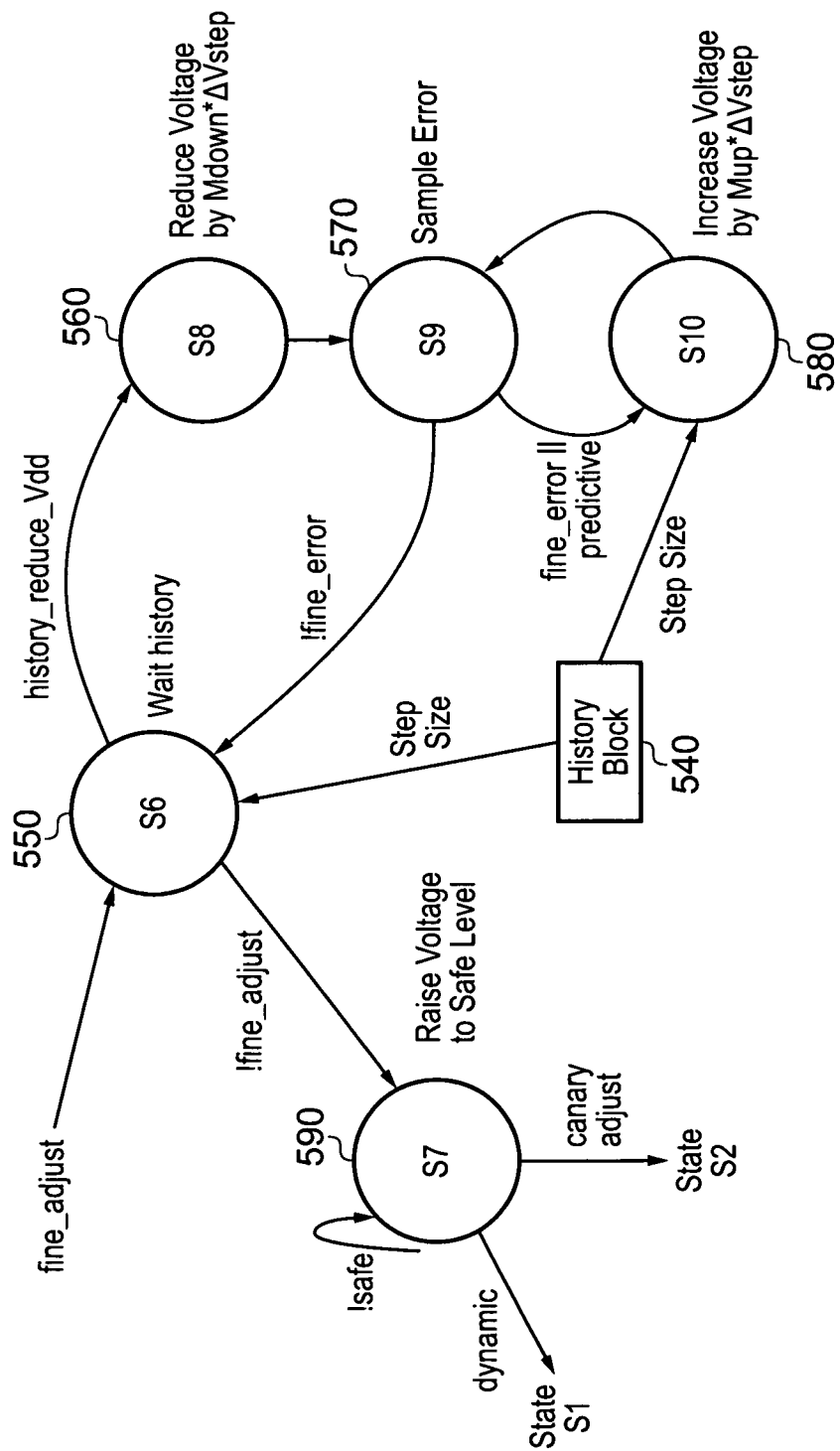

FIGS. 7 and 8 schematically illustrate the operation of the state machine 40 when performing the above described coarse and fine adjustment processes. In particular, as shown in FIG. 7, following a power on reset or a soft reset, the state machines enters state zero 500 where a stable nominal supply voltage is awaited. Once the stable nominal supply voltage is achieved, then the state transitions to state 1 if it is determined that the dynamic adjustment mode is to be used, whereas the process transitions to state 2 510 if it is determined that the canary adjustment mode is to be used.

Whilst in the dynamic adjustment state 505, the voltage is programmed to a desired supply voltage value, whereafter the dynamic mode may be exited by returning to state 0 500, enabling the state machine to then transition to the fine adjustment mode, and in particular state 6 described later with reference to FIG. 8. Alternatively, the state machine may transition directly from state 1 505 to state 2 510, in order to enter the canary adjustment mode of operation following the dynamic mode of operation.

In state 2 510, the parameters $N_{down}$ and $N_{up}$ are established, whereafter the state transitions to state 3 515, where the voltage supply is reduced by the programmed decrease amount, and a test of the canary circuitry is then performed. In the absence of a canary error, the state transitions back to state 2 510, where any desired adjustments to $N_{down}$ or $N_{up}$ can be made, and the state then transitions again to state 3 515.

If in state 3 a canary error is detected, the state transitions to state 4 520 where the voltage is increased by the programmed increase amount. Thereafter, the state transitions to state 5 525 where a fixed time is waited to pass to allow for the new voltage level to become stable.

From state 5, the state can then transition back to state 2 510 if the state machine is being maintained in the continuous canary mode of operation, can transition back to the dynamic state 1 505 if it is desired to enter the dynamic mode of operation, or can transition directly to state 6 to be described with reference to FIG. 8 if it is decided to enter the fine adjustment mode of operation.

As shown in FIG. 8, the fine adjustment mode is entered at the state 6 550 where error rate history information is awaited. Initial history information may be derived from a previous execution of the system in the fine adjustment mode of operation, or can be set to some predetermined value. In any event, the history block 540 will, based on history information, specify step size information to the state machine in state 6, this being used to establish the initial values of $M_{up}$ and $M_{down}$.

The state machine then transitions from state 6 to state 8 560 where the voltage level is reduced by the currently programmed variable decrease amount. The state then transitions to state 9 570, where an error response from the system is sampled in order to determine whether an error has been detected by the in-situ error correction circuit 25. If not, the process returns via state 6 550 to state 8 560, where the voltage is again reduced.

However, if an error is detected in state 9 570 or some prediction data provided to the state machine indicates that an error is imminent, the state machine transitions to state 10 580, where the voltage is increased by the currently programmed variable increase amount, again this being defined by step size information provided from the history block 540. Following the setting of an appropriate feedback control signal to increase the voltage by the variable increase amount, the state machine then transitions back to state 9 570 where the error response from the system is again sampled.

With regard to predictive information that may cause the transition from state 9 570 to state 10 580, software executing on the functional circuitry may identify that a change in activity level is about to occur, in particular to a level where the functional circuitry is going to be significantly more active. Such a change is likely to trigger an error in the in-situ error correction circuit 25 if the voltage is maintained at its current level, and accordingly it is a good indication to cause the state to transition to the state 10 580 to cause the voltage to be increased. Similarly, the current surge detector 120 described earlier with reference to FIG. 2 is a hardware example of a circuit that can predict a change in activity level, and notify the state machine to transition from state 9 570 to state 10 580.

If at some point it is determined to exit the fine adjustment mode of operation, the state of the state machine transitions from state 6 550 to state 7 590, where the voltage level is raised to some predefined safe level, and once the safe voltage has been realised, the state can then transition either back to state 1 505 if the dynamic mode of operation is now being entered, or can transition back to state 2 510 if the canary adjustment mode of operation is to be entered.

In the above described example of FIGS. 7 and 8, it is assumed that the coarse up and down adjustment sizes are fixed, i.e. $N_{down}$ and $N_{up}$ are fixed, whilst the step sizes $M_{down}$ and $M_{up}$ in the fine adjustment mode of operation are varied based on the history information. However, as indicated earlier when discussing state 2 510 of FIG. 7, it is possible during the canary mode setup process to alter the coarse up and down adjustment sizes used in the canary mode of operation if desired, and in one embodiment this could be achieved by maintaining some history of the errors detected by the canary timing detector 130.

One example of a situation where it would be appropriate to exit the fine adjustment mode of operation would be in a situation where the functional circuitry changes to an operating state where a non-zero rate of errors cannot be tolerated. In such situations it may instead be better to enter the dynamic mode or the canary adjustment mode. Similarly, in situations where the operating state of the processor changes and this is likely to give rise to a significant change in activity level, it may be appropriate to exit the fine adjustment mode of operation and to enter either the dynamic mode or the canary adjustment mode. Indeed, if the dynamic mode is entered, it is possible in one embodiment for the programmable interface 42 to be used to program in a variety of initial values, each initial value being associated with a different operating state, so that whilst in the dynamic state 1 505, the state machine will cause the supply voltage to be set to a particular level suitable for the operating state to which the functional circuitry is transitioning.

Upon occurrence of one or more predetermined events, it may also be appropriate to reset the error rate history information maintained by the error rate history circuitry 50. Again a change in activity level would be an example of a situation where it might be appropriate to reset the error rate history information.

In accordance with the above described embodiments, a voltage adjustment process is provided where the power supply can be adjusted immediately on a system power up using a coarse tuning algorithm to establish a minimum operating power supply. This helps the system to run more efficiently right after start up and hence starts mitigating the leakage and dynamic currents, immediately reducing both power and self hearting on the silicon. The coarse tuning algorithm when operating in canary mode uses a known critical path on the chip to set the minimum power supply required for circuit functionality. The speed path is typically tested at the maximum clock frequency starting with a nominal supply voltage of say 1.0V, and the output of the canary flip-flop is monitored for correct data propagation. The voltage supply continues to be decreased until an error is flagged by the canary circuitry, whereafter the voltage supply is then increased by a specified increase amount.

As described with reference to FIG. 4B, the coarse adjustment can be made either dynamic or adaptive. Furthermore, irrespective of whether an initial coarse adjustment is made, the data processing system can then be placed into a fine adjustment mode of operation, where in-situ error detection is used to fine tune the voltage supply in order to achieve higher accuracy with regard to the setting of the voltage level. In particular, the voltage supply adjustment is further fine tuned in order to achieve the best energy-delay operating point. The fine tuning algorithm is used in a continuous mode where it is driven by the closed loop feedback errors when the chip is operating. During normal operation the silicon die temperature can change, and accordingly the circuit delay also changes leading to more timing errors. In this case, the fine adjustment process can automatically adjust the supply voltage accordingly with the aim of seeking to eliminate such additional timing errors.

The above described techniques have been found to provide an improved adaptive power management technique that can significantly reduce leakage and dynamic power consumption within modern data processing systems.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing system comprising:
    functional circuitry configured to operate from a voltage supply whose voltage level is variable, the functional circuitry including at least one error correction circuit configured to detect errors in operation of the functional circuitry and to repair those errors in operation;
    voltage regulator circuitry configured to provide the voltage supply to the functional circuitry, the voltage regulator circuitry is configured to modify the voltage level of the voltage supply based on a feedback control signal;
    error rate history circuitry configured to receive error indications from said at least one error correction circuit during operation of the functional circuitry, and to generate error rate history information; and
    an adaptive controller configured to generate the feedback control signal in dependence upon said error rate history information, such that the adaptive controller adjusts the feedback control signal over time in dependence upon the error rate history information in order to obtain a predetermined target non-zero error rate within the functional circuitry, wherein:
    the adaptive controller is configured to apply a feedback control setting algorithm that generates a sequence of feedback control signals so as to increase the voltage level of the voltage supply by a variable increase amount upon occurrence of an error detected by said at least one error correction circuit and, once said error is no longer detected, to then reduce the voltage level of the voltage supply until a next occurrence of an error detected by said at least one error correction circuit; and
    the feedback control setting algorithm is configured to alter the variable increase amount based on said error rate history information in order to obtain said predetermined target non-zero error rate.

2. A data processing system as claimed in claim 1, wherein:
    the feedback control signal issued by the adaptive controller specifies the variable increase amount as a multiple $M_{up}$ of a minimum adjustment value, the multiple $M_{up}$ being an integer of 1 or more; and
    the adaptive controller adjusts the value of $M_{up}$ over time in dependence upon the error rate history information in order to obtain said predetermined target non-zero error rate within the functional circuitry.

3. A data processing system as claimed in claim 1, wherein:
    when reducing the voltage level of the voltage supply, each feedback control signal in said sequence issued by the adaptive controller causes the voltage regulator circuitry to decrease the voltage level by a specified decrease amount.

4. A data processing system as claimed in claim 3, wherein:
    the feedback control signal issued by the adaptive controller identifies the specified decrease amount as a multiple $M_{down}$ of a minimum adjustment value, the multiple $M_{down}$ being an integer of 1 or more.

5. A data processing system as claimed in claim 4, wherein the specified decrease amount is variable, the adaptive controller being arranged to adjust the value of $M_{down}$ independently of the value of a variable $M_{up}$ used to specify the variable increase amount as a multiple of the minimum adjustment value.

6. A data processing system comprising:
    functional circuitry configured to operate from a voltage supply whose voltage level is variable, the functional circuitry including at least one error correction circuit configured to detect errors in operation of the functional circuitry and to repair those errors in operation:
    voltage regulator circuitry configured to provide the voltage supply to the functional circuitry, the voltage regulator circuitry is configured to modify the voltage level of the voltage supply based on a feedback control signal;
    error rate history circuitry configured to receive error indications from said at least one error correction circuit during operation of the functional circuitry, and to generate error rate history information; and
    an adaptive controller configured to generate the feedback control signal in dependence upon said error rate history information, such that the adaptive controller adjusts the feedback control signal over time in dependence upon the error rate history information in order to obtain a predetermined target non-zero error rate within the functional circuitry, wherein the voltage regulator circuitry has a predetermined voltage range within which the voltage level of the voltage supply is variable, wherein:
    the feedback control signal is an N bit value, enabling up to $2^N$ discrete voltage levels for the voltage supply to be specified; and
    the voltage regulator circuitry is configured to convert the feedback control signal into an analogue voltage used to modify the voltage level of the voltage supply.

7. A data processing system as claimed in claim 1, wherein the adaptive controller has an interface via which an initial value of said feedback control signal is specified, the adaptive controller being configured to select the initial value on occurrence of a predetermined event.

8. A data processing system as claimed in claim 7, wherein a set of initial values are programmed into the adaptive controller via the interface, each initial value relating to a particular operating state of the data processing system, and the adaptive controller being configured to select one of the initial values dependent on an operating state of the data processing system at the time the predetermined event occurs.

9. A data processing system comprising:
functional circuitry configured to operate from a voltage supply whose voltage level is variable, the functional circuitry including at least one error correction circuit configured to detect errors in operation of the functional circuitry and to repair those errors in operation;
voltage regulator circuitry configured to provide the voltage supply to the functional circuitry, the voltage regulator circuitry is configured to modify the voltage level of the voltage supply based on a feedback control signal;
error rate history circuitry configured to receive error indications from said at least one error correction circuit during operation of the functional circuitry, and to generate error rate history information;
an adaptive controller configured to generate the feedback control signal in dependence upon said error rate history information such that the adaptive controller adjusts the feedback control signal over time in dependence upon the error rate history information in order to obtain a predetermined target non-zero error rate within the functional circuitry; and
canary circuitry configured to receive said voltage supply and to operate in parallel with the functional circuitry, the canary circuitry being configured to generate an error ahead of an error occurring in the functional circuitry;
the adaptive controller being operable in both an in-situ error mode of operation and a canary mode of operation, in the in-situ error mode of operation the adaptive controller being configured to generate the feedback control signal based on the error rate history information generated from the error indications from said at least one error correction circuit, and in the canary mode of operation the adaptive controller being configured to generate the feedback control signal based on error rate history information derived from error indications received from the canary circuit.

10. A data processing system as claimed in claim 9, wherein following an initialisation sequence, the adaptive controller is operated in said canary mode of operation for an initial period of time and is then switched to said in-situ error mode of operation.

11. A data processing system as claimed in claim 10, wherein said initialisation sequence comprises a power on reset operation.

12. A data processing system as claimed in claim 10, wherein in said canary mode of operation the adaptive controller reduces the voltage level of the voltage supply over time until an error is detected in the canary circuitry, and the initial period of time continues until at least one error has been detected in the canary circuitry.

13. A data processing system as claimed in claim 9, wherein when in the canary mode of operation the adaptive controller is configured to generate feedback control signals that cause the voltage regulator to modify the voltage level of the voltage supply in larger increments than when in the in-situ error mode of operation.

14. A data processing system as claimed in claim 13, wherein the adaptive controller is configured to specify different sizes of increment for an increase in the voltage level and a decrease in the voltage level.

15. A data processing system as claimed in claim 9, wherein on detection of an operating state where a non-zero rate of error in the functional circuitry cannot be tolerated, the adaptive controller is caused to enter said canary mode of operation.

16. A data processing system as claimed in claim 1, wherein said error rate history circuitry is provided within the adaptive controller.

17. A data processing system as claimed in claim 1, wherein the error rate history circuitry comprises a digital filter for applying a filtering operation to the error indications received over a period of time in order to generate an average error rate for that period of time.

18. A data processing system as claimed in claim 1, wherein the adaptive controller is configured, on occurrence of at least one predetermined event, to reset the error rate history information maintained by the error rate history circuitry.

19. A data processing system as claimed in claim 18, wherein said at least one predetermined event comprises a change in activity level of the functional circuitry.

20. A data processing system as claimed in claim 19, wherein said change in activity level is signalled by software executing on the functional circuitry.

21. A data processing system comprising:
functional circuitry configured to operate from a voltage supply whose voltage level is variable, the functional circuitry including at least one error correction circuit configured to detect errors in operation of the functional circuitry and to repair those errors in operation;
voltage regulator circuitry configured to provide the voltage supply to the functional circuitry, the voltage regulator circuitry is configured to modify the voltage level of the voltage supply based on a feedback control signal;
error rate history circuitry configured to receive error indications from said at least one error correction circuit during operation of the functional circuitry, and to generate error rate history information;
an adaptive controller configured to generate the feedback control signal in dependence upon said error rate history information, such that the adaptive controller adjusts the feedback control signal over time in dependence upon the error rate history information in order to obtain a predetermined target non-zero error rate within the functional circuitry, wherein the adaptive controller is configured, on occurrence of at least one predetermined event, to reset the error rate history information maintained by the error rate history circuitry; and
prediction circuitry configured to predict a change in activity level of the functional circuitry based on observed changes in load on a voltage line providing the voltage supply to the functional circuitry, and upon said detection to trigger said predetermined event.

22. A data processing system as claimed in claim 1, wherein said adaptive controller comprises a state machine.

23. A data processing system as claimed in claim 1, wherein the adaptive controller is arranged to receive a ready signal from the voltage regulator circuitry identifying when the voltage level of the voltage supply most recently set by the voltage regulator has reached a steady state.

24. A data processing system comprising:
functional circuitry configured to operate from a voltage supply whose voltage level is variable, the functional circuitry including at least one error correction circuit configured to detect errors in operation of the functional circuitry and to repair those errors in operation;

voltage regulator circuitry configured to provide the voltage supply to the functional circuitry, the voltage regulator circuitry is configured to modify the voltage level of the voltage supply based on a feedback control signal;

error rate history circuitry configured to receive error indications from said at least one error correction circuit during operation of the functional circuitry, and to generate error rate history information;

an adaptive controller configured to generate the feedback control signal in dependence upon said error rate history information, such that the adaptive controller adjusts the feedback control signal over time in dependence upon the error rate history information in order to obtain a predetermined target non-zero error rate within the functional circuitry; and clock frequency control circuitry responsive to detection of an error by said at least one error correction circuit to reduce the operating frequency of the functional circuitry from a normal frequency to a recovery frequency to enable said at least one error correction circuit to repair said error;

wherein the adaptive controller is configured, after the voltage regulator has modified the voltage level, to issue a control signal to the clock frequency control circuitry to cause the operating frequency to be returned to said normal frequency.

25. A data processing system as claimed in claim 24, wherein:

the voltage regulator circuitry transitions the voltage supply from a current voltage level to a new voltage level corresponding to the feedback control signal over a period of time;

the adaptive controller is arranged to receive a multi-bit ready signal from the voltage regulator circuitry identifying progress of the voltage level modification being performed by the voltage regulator circuitry; and the adaptive controller is configured, in response to the multi-bit ready signal indicating that a predetermined amount of progress has occurred, to issue the control signal to the clock frequency control circuitry to cause the operating frequency to be returned to said normal frequency.

26. A data processing system as claimed in claim 1, wherein said functional circuitry, voltage regulator circuitry, error rate history circuitry and adaptive controller are provided on an integrated circuit.

27. A data processing system comprising:

functional circuit means for operating from a voltage supply whose voltage level is variable, the functional circuit means including at least one error correction means for detecting errors in operation of the functional circuit means and for repairing those errors in operation;

voltage regulator means for providing the voltage supply to the functional circuit means, the voltage regulator means for modifying the voltage level of the voltage supply based on a feedback control signal;

error rate history means for receiving error indications from said at least one error correction means during operation of the functional circuit means, and for generating error rate history information; and adaptive controller means for generating the feedback control signal in dependence on said error rate history information, such that the adaptive controller means adjusts the feedback control signal over time in dependence upon the error rate history information in order to obtain a predetermined target non-zero error rate within the functional circuit means, wherein the adaptive controller means is configured to apply a feedback control setting algorithm that generates a sequence of feedback control signals so as to increase the voltage level of the voltage supply by a variable increase amount upon occurrence of an error detected by said at least one error correction means and, once said error is no longer detected, to then reduce the voltage level of the voltage supply until a next occurrence of an error detected by said at least one error correction means; and the feedback control setting algorithm is configured to alter the variable increase amount based on said error rate history information in order to obtain said predetermined target non-zero error rate.

28. A method of regulating a voltage supply to functional circuitry of a data processing system, the functional circuitry including at least one error correction circuit configured to detect errors in operation of the functional circuitry and to repair those errors in operation, the method comprising the steps of:

modifying the voltage level of the voltage supply based on a feedback control signal;

receiving error indications from said at least one error correction circuit during operation of the functional circuitry, and generating error rate history information; and generating the feedback control signal in dependence on said error rate history information, such that the feedback control signal is adjusted over time in dependence upon the error rate history information in order to obtain a predetermined target non-zero error rate within the functional circuitry, wherein said generating step comprises applying a feedback control setting algorithm that generates a sequence of feedback control signals so as to increase the voltage level of the voltage supply by a variable increase amount upon occurrence of an error detected by said at least one error correction circuit and, once said error is no longer detected, to then reduce the voltage level of the voltage supply until a next occurrence of an error detected by said at least one error correction circuit; and the feedback control setting algorithm is configured to alter the variable increase amount based on said error rate history information in order to obtain said predetermined target non-zero error rate.

* * * * *